United States Patent
Abe et al.

(10) Patent No.: US 10,507,539 B2
(45) Date of Patent: Dec. 17, 2019

(54) WIRE ELECTRIC DISCHARGE MACHINE AND METHOD FOR CORRECTING WIRE ELECTRODE CONNECTION HOLE POSITION

(71) Applicant: FANUC Corporation, Yamanashi (JP)

(72) Inventors: Hiroyuki Abe, Yamanashi (JP); Kaoru Hiraga, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/049,858

(22) Filed: Feb. 22, 2016

(65) Prior Publication Data
US 2016/0243635 A1 Aug. 25, 2016

(30) Foreign Application Priority Data
Feb. 24, 2015 (JP) .................................. 2015-033655

(51) Int. Cl.
*B23H 7/10* (2006.01)
*B23H 1/02* (2006.01)
*B23H 7/20* (2006.01)

(52) U.S. Cl.
CPC .............. *B23H 1/02* (2013.01); *B23H 1/024* (2013.01); *B23H 7/102* (2013.01); *B23H 7/20* (2013.01)

(58) Field of Classification Search
CPC .......... B23H 1/02; B23H 1/024; B23H 7/102; B23H 7/20; B23H 7/10; B23H 7/00;
(Continued)

(56) References Cited

U.S. PATENT DOCUMENTS 3,987,270 A * 10/1976 Ullmann ................ B23H 7/102
219/69.12
4,350,864 A * 9/1982 Janicke .................... B23H 7/10
219/69.12
(Continued)

FOREIGN PATENT DOCUMENTS

CN 1715010 A 1/2006
JP S56-119327 A 9/1981
(Continued)

OTHER PUBLICATIONS

Decision to Grant a Patent in JP Application No. 2015-033655, dated Oct. 4, 2016.
(Continued)

*Primary Examiner* — Tu B Hoang
*Assistant Examiner* — Masahiko Muranami
(74) *Attorney, Agent, or Firm* — Hauptman Ham, LLP

(57) ABSTRACT

A wire electric discharge machine configured to interrupt a program operation if a connection hole for connecting a wire electrode is located in a position deviated from a wire electrode connection position on a machining path so that connection by a wire electrode connection unit is not completed and store the wire electrode connection position, and to restart the program operation after performing machining such that the wire electrode is returned to the wire electrode connection position by automatic control and machining to widen a machined groove portion in the wire electrode connection position, when subjected to a re-machining operation after manual connection of the wire electrode in the position of the connection hole.

4 Claims, 5 Drawing Sheets

(58) Field of Classification Search
CPC ... B23H 1/00; B23H 7/02; B23H 7/26; B23H 2400/00; B23H 2400/10; B23H 2500/00; B23H 2500/20; B23H 2600/10; G05B 2219/45043; G05B 19/418; G06Q 50/04; G06Q 50/00; G06F 9/46; G06F 3/048; G06N 5/02
USPC .......... 219/69.1, 69.11, 69.12, 69.15, 69.16, 219/69.17, 86.41; 700/162, 159, 160, 700/178, 177, 184, 192, 193
See application file for complete search history.

(56) References Cited

U.S. PATENT DOCUMENTS

| | | | | |
|---|---|---|---|---|
| 4,506,129 | A * | 3/1985 | Katsube | B23H 7/04 219/69.12 |
| 4,513,191 | A * | 4/1985 | Inoue | B23H 7/102 219/69.17 |
| 4,598,189 | A * | 7/1986 | Inoue | B23H 7/10 204/206 |
| 4,686,343 | A * | 8/1987 | Inoue | B23H 7/102 219/69.12 |
| 5,055,649 | A | 10/1991 | Iwasaki et al. | |
| 5,077,457 | A * | 12/1991 | Onaka | B23H 7/10 219/69.12 |
| 5,113,051 | A * | 5/1992 | Sakaue | B23H 7/101 219/69.12 |
| 5,138,126 | A * | 8/1992 | Naka | B23H 7/065 219/69.12 |
| 5,338,912 | A * | 8/1994 | Iwasaki | B23H 7/10 219/69.12 |
| 5,753,880 | A * | 5/1998 | Kajitori | B23H 7/102 219/69.12 |
| 6,028,281 | A * | 2/2000 | Yamada | B23H 7/065 219/69.12 |
| 2004/0011767 | A1 * | 1/2004 | Hattori | B23H 7/065 219/69.12 |
| 2004/0060907 | A1 | 4/2004 | Takeyama | |
| 2006/0009878 | A1 | 1/2006 | Kobayashi et al. | |
| 2012/0031879 | A1 * | 2/2012 | Abe | B23H 7/065 219/69.12 |
| 2016/0039029 | A1 | 2/2016 | Hasegawa | |

FOREIGN PATENT DOCUMENTS

| | | | | |
|---|---|---|---|---|
| JP | 62-173118 A | * | 7/1987 | ............... B23H 7/10 |
| JP | 64-51229 | * | 2/1989 | ............... B23H 7/10 |
| JP | 64-051229 A | * | 2/1989 | ............... B23H 7/10 |
| JP | 64-51229 A | | 2/1989 | |
| JP | H01-135423 A | | 5/1989 | |
| JP | 02-311221 A | | 12/1990 | |
| JP | H05-234749 A | | 10/1993 | |
| JP | 10-180547 A | | 7/1998 | |
| JP | 2000-135626 A | | 5/2000 | |
| JP | 2002-239840 A | | 8/2002 | |
| JP | 2004-122260 A | | 4/2004 | |
| JP | 2005-1054 A | | 1/2005 | |
| JP | 2008-846 A | | 1/2008 | |
| JP | 2016-40070 A | | 3/2016 | |

OTHER PUBLICATIONS

Extended European Search Report in EP Application No. 16156207.9, dated Jun. 28, 2016.

Office Action in Chinese Application No. 201610099565.9, dated May 10, 2018, 15 pp.

* cited by examiner

UNSUCCESSFUL AUTOMATIC CONNECTION

MANUAL CONNECTION OF WIRE ELECTRODE

OPERATOR MANUALLY OPERATES TO MOVE WIRE ELECTRODE

AUTOMATIC MACHINING TO CONNECTION POSITION

AUTOMATIC MACHINING OF CONNECTION HOLE

WIRE ELECTRIC DISCHARGE MACHINE AND METHOD FOR CORRECTING WIRE ELECTRODE CONNECTION HOLE POSITION

RELATED APPLICATIONS

The present application claims priority to Japanese Patent Application Number 2015-33655, filed Feb. 24, 2015, the disclosure of which is hereby incorporated by reference herein in its entirety.

BACKGROUND OF THE INVENTION

Field of the Invention

The present invention relates to a wire electric discharge machine and a wire electric discharge machining method, and more particularly, to a wire electric discharge machine and a wire electric discharge machining method, capable of easily continuing an original machining program after stopping a program operation in a state to allow an operator's manual intervention and performing manual connection if the position of a connection hole is not correct so that wire connection cannot be accomplished.

Description of the Related Art

In performing electric discharge machining of a workpiece using a wire electrode in a wire electric discharge machine, a method is adopted such that the wire electrode is inserted into a connection hole previously formed in the workpiece so that the workpiece can be electric-discharge-machined starting at the connection hole. However, the wire electrode used in the conventional wire electric discharge machine is a fine wire with a diameter of about 0.2 mm, and the connection hole that serves as a starting point of machining is a small hole formed with a diameter ranging from about 0.5 to 1.0 mm.

The smaller the diameter of the connection hole, therefore, the more difficult it is to machine the hole. If the position or roundness of the connection hole is irregular or abnormal, therefore, an operation for connecting the wire electrode, that is, the machining, cannot be completed, so that the yield of machined products produced by the wire electric discharge machine is reduced. Accordingly, the connection operation is variously devised to improve the success rate of the automatic connection.

The following is a description of three main conventional methods for automatic wire electrode connection.

[Method 1] A failure in wire electrode insertion into the connection hole is detected and the insertion operation is repeated (see Japanese Patent Application Laid-Open No. 01-135423).

[Method 2] Water or air is added as an assistant to improve the efficiency of the wire electrode insertion (see Japanese Patent Application Laid-Open No. 02-311221).

[Method 3] An XY-table is moved in a specific operation pattern to search for the hole position (see Japanese Patent Applications Laid-Open Nos. 56-119327, 02-311221, 05-253749).

However, the prior art methods for automatic wire electrode connection have the following problems. Although Methods 1 and 2 are effective if a failure is caused by peculiar winding of the wire electrode, they cannot properly deal with abnormality such as irregularity in the position or roundness of the connection hole. Method 3 is effective if the connection hole is located within the range of the search operation pattern. According to this method, however, a wire electrode 1 may fail to be automatically connected in an original connection position 4, and an actual hole position 3 of a connection hole 2 may sometimes be outside the search range of a search operation pattern 5, as shown in FIG. 4, so that the wire electrode 1 cannot be reliably connected. Further, this method is time-consuming and requires expensive search equipment.

Furthermore, there is another problem that the continuation of machining after the failure in the wire electrode connection takes much time and labor. Various steps of conventional machining continuation procedure are shown in the flowchart of FIG. 5.

[Step S201] Processing for wire electrode connection is started.

[Step S202] The automatic connection of the wire electrode is attempted and it is determined whether or not the automatic connection is successful. If the automatic connection is successful, the procedure proceeds to Step S211. If not successful, the procedure proceeds to Step S203.

[Step S203] An operator manually moves an XY-table so that the wire electrode is aligned with the position of the connection hole and manually connects the wire electrode.

[Step S204] The wire electric discharge machine is manually brought into a dischargeable state to start manual electric discharge machining. [Step S205] The XY-table is gradually manually moved in a return direction, taking care not to short-circuit the movement in Step S203.

[Step S206] It is determined whether or not the wire electrode is returned to the original connection position by the movement of the XY-table in Step S205. If the wire electrode is returned to the original connection position, the procedure proceeds to Step S207. If not, the procedure returns to Step S205, in which the manual movement is repeated.

[Step S207] In the connection position, the connection hole is formed by gradually manually moving the wire, taking care not to bring about a short-circuit state.

[Step S208] It is determined whether or not the formation of the connection hole is completed by the movement in Step S207. If the formation of the connection hole is completed, the procedure proceeds to Step S209. If not, the procedure returns to Step S207, in which the manual movement is repeated.

[Step S209] The manual electric discharge machining ends.

[Step S210] The operator performs a re-machining operation for switching from manual control to automatic control.

[Step S211] The electric discharge machining based on an original program operation is continued.

In Step S203, the operator can quickly retrieve the position of the connection hole by searching for it visually or by means of water, air, or the like, as an assistant. In Steps S204 to S206, moreover, a necessary manual operation is performed for the case in which the wire electrode and the workpiece are supposed to be short-circuited due to a connection failure, although the wire electrode and the workpiece can easily be returned in response to a fast-forward command or the like unless the short-circuit state is brought about.

Specific operations in Steps S204 to S206 will be described with reference to FIG. 6. After the operator manually makes the wire electric discharge machine dischargeable, he/she operates a control panel or the like to manually move back the XY-table by about 0.1 mm for the movement in Step S203, whereupon the wire electrode 1 approaches a workpiece 6 so that electric discharge starts between them (FIG. 6A). Thereafter, termination of the machining of the workpiece 6 by electric discharge is awaited (for about 10 seconds) (FIG. 6B). The wire is moved to the original connection position 4 of the connection hole 2 by repeating the above-described procedure (FIG. 6C).

Further, specific operations in Steps S207 and S208 will be described with reference to FIG. 6D. When the operator manually operates the wire electric discharge machine in the dischargeable state, thereby manually moving it by about 0.1 mm to widen a groove, the wire electrode approaches the workpiece so that electric discharge starts between them. Thereafter, termination of the machining of the workpiece by electric discharge is awaited (for about 10 seconds). The connection hole is formed in its original connection position 4 by repeating the above-described procedure (FIG. 6D).

The total time required for these operations is 6 minutes; 0.5 minute for the table movement in Step S203, 0.5 minute for manual connection, 4 minutes for Steps S204 to S206, and about one minute for Steps S207 and S208. If there are 10 connection holes that require these operations, a one-hour manual operation is inevitably required.

If there is such a problem with the connection hole position, much time and labor is required, resulting in a considerable reduction in productivity. If the re-machining operation (Step S210) for switching from the manual control to the automatic control is performed without the execution of Steps S204 to S206, the position is determined to be incorrect, though depending on the structure of a control device. Consequently, the machining is not continued, a correct position is forcibly restored by fast feed such that the wire electrode and the workpiece are short-circuited or the wire electrode is broken, or the machining is inevitably restarted with the position deviated by a margin equivalent to the manual movement. Thus, resulting machined components are defective. In any case, the machining cannot be properly continued.

If the machining based on the original program operation is continued without the execution of Steps S207 and S208 (Step S211), moreover, then only a machined groove exists in a position in which the machining based on the original program operation is started. If the wire electrode is broken thereafter, a function of automatically reconnecting it may be used. Since the wire connection in the machined groove is difficult and liable to fail, however, the automatic operation is inevitably stopped. To prevent this, it is necessary to previously form a connection hole for automatic connection.

SUMMARY OF THE INVENTION

Accordingly, the object of the present invention is to provide a wire electric discharge machine and a wire electric discharge machining method, capable of reducing the time and labor for an operator's manual operation for wire connection.

A wire electric discharge machine according to the present invention performs a program operation in accordance with a machining program, comprises machining path creation unit for creating a machining path based on an axis movement command of the machining program and wire electrode connection unit for connecting a wire electrode based on a wire electrode connection command of the machining program, and relatively moves the wire electrode and a workpiece along the machining path to perform machining. The wire electric discharge machine comprises program operation interruption unit configured to interrupt the program operation if a connection hole for connecting the wire electrode is located in a position deviated from a wire electrode connection position on the machining path so that the connection by the wire electrode connection unit is not completed, wire electrode connection position storage unit configured to store the wire electrode connection position, wire electrode position comparing unit configured to compare the position of the connected wire electrode and the wire electrode connection position stored by the wire electrode connection position storage unit after the wire electrode is manually moved to the position of the connection hole by an operator, the wire electrode is manually connected in the position of the connection hole, and a re-machining operation is performed, wire electrode connection position return machining unit configured to perform machining such that the wire electrode is returned to the wire electrode connection position if the positions compared by the wire electrode position comparing unit are not coincident, and program operation restart unit configured to restart the program operation after the wire electrode is returned to the wire electrode connection position. The program operation is performed along the machining path.

The wire electric discharge machine according to the present invention further comprises connection position extension machining unit configured to perform machining to widen a machined groove portion in the wire electrode connection position after the wire electrode is returned to the wire electrode connection position. The program operation can be restarted after the machining by the connection position extension machining unit.

A wire electric discharge machining method according to the present invention is a method in which a program operation is performed in accordance with a machining program, a machining path is created based on an axis movement command of the machining program, a wire electrode is connected based on a wire electrode connection command of the machining program, and the wire electrode and a workpiece are relatively moved along the machining path to perform machining. The wire electric discharge machining method comprises a step of interrupting the program operation if a connection hole for connecting the wire electrode is located in a position deviated from a wire electrode connection position on the machining path so that the connection based on the wire electrode connection command is not completed, a step of storing the wire electrode connection position, a step of accepting a re-machining command after the wire electrode is manually moved to the position of the connection hole and manually connected in the position of the connection hole, a step of performing machining such that the wire electrode is returned to the stored wire electrode connection position, and a step of performing the program operation along the machining path.

The wire electric discharge machining method according to the present invention further comprises a step of performing machining to widen a machined groove portion in the wire electrode connection position after the step of performing the machining such that the wire electrode is returned to the stored wire electrode connection position. The step of performing the program operation along the machining path is executed after the step of performing the machining to widen the machined groove portion in the wire electrode connection position.

According to the present invention, the time and labor for an operator's manual operation required if there is a problem with the position of a connection hole in a workpiece during wire electric discharge machining can be saved to improve productivity.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

An embodiment of the present invention will now be described with reference to the accompanying drawings.

The present invention is contrived to improve the efficiency of machining continuation work after wire electrode connection, based on a premise that a part of a connection operation is manually assisted. A wire electric discharge machine of the present invention solves the prior art problems by performing the operations of Steps S204 to S206 and Steps S207 and S208, which are manually performed in the prior art, by automatic control by means of its control unit.

Figure 1A:
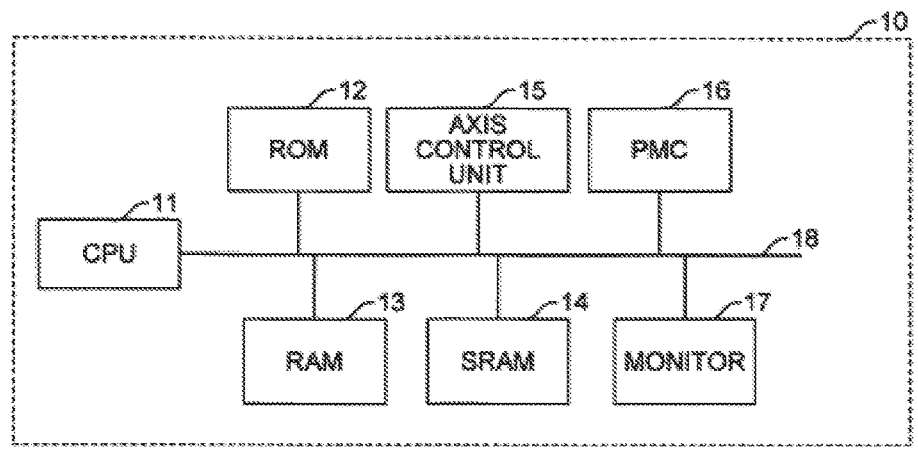
FIG. 1A is a schematic block diagram of a control unit for controlling a wire electric discharge machine according to one embodiment of the present invention.

FIG. 1A is a functional block diagram showing a main configuration of a control unit for controlling a wire electric discharge machine according to one embodiment of the present invention. A control unit 10 for controlling the wire electric discharge machine of the present embodiment comprises a CPU 11, ROM 12, RAM 13, SRAM 14, axis control unit 15, PMC 16, and monitor 17.

The CPU 11 is a processor for integrally controlling various parts of the control unit 10 and is connected to various constituent elements of the control unit through a bus 18.

The ROM 12 is stored with basic system software that is required to activate the functions of the control unit 10. As the CPU 11 reads and executes this system software, various parts of the control unit 10, including the CPU 11, ROM 12, RAM 13, SRAM 14, axis control unit 15, PMC 16, and monitor 17, are controlled to operate.

The RAM 13 is used as a temporary storage area for the execution of the system software and a machining program and is loaded with temporary calculation data, temporary record data, display data, and the like.

The SRAM 14 is constructed as a nonvolatile memory that is backed up by a battery so that it can maintain a storage state even after the power supply is cut off. The SRAM 14 is stored with configuration parameters and machining programs used for the control of the wire electric discharge machine, input data input through a manual input means unit (not shown), and the like.

The axis control unit 15 outputs an axis command to a servo amplifier (not shown) on receiving an axis movement command from the CPU 11. On receiving this axis command, the servo amplifier drives a servomotor of the wire electric discharge machine.

The PMC (programmable machine controller) 16 outputs a signal to an auxiliary device of the wire electric discharge machine, thereby controlling the auxiliary device, in accordance with a sequence program stored in the control unit 10. Further, the PMC 16 receives and properly processes signals from various switches on a control panel on the main body of the wire electric discharge machine, and then delivers the processed signals to the CPU 11.

The monitor 17 displays the states of the control unit 10 and the wire electric discharge machine under the control by the system software.

Figure 1B:
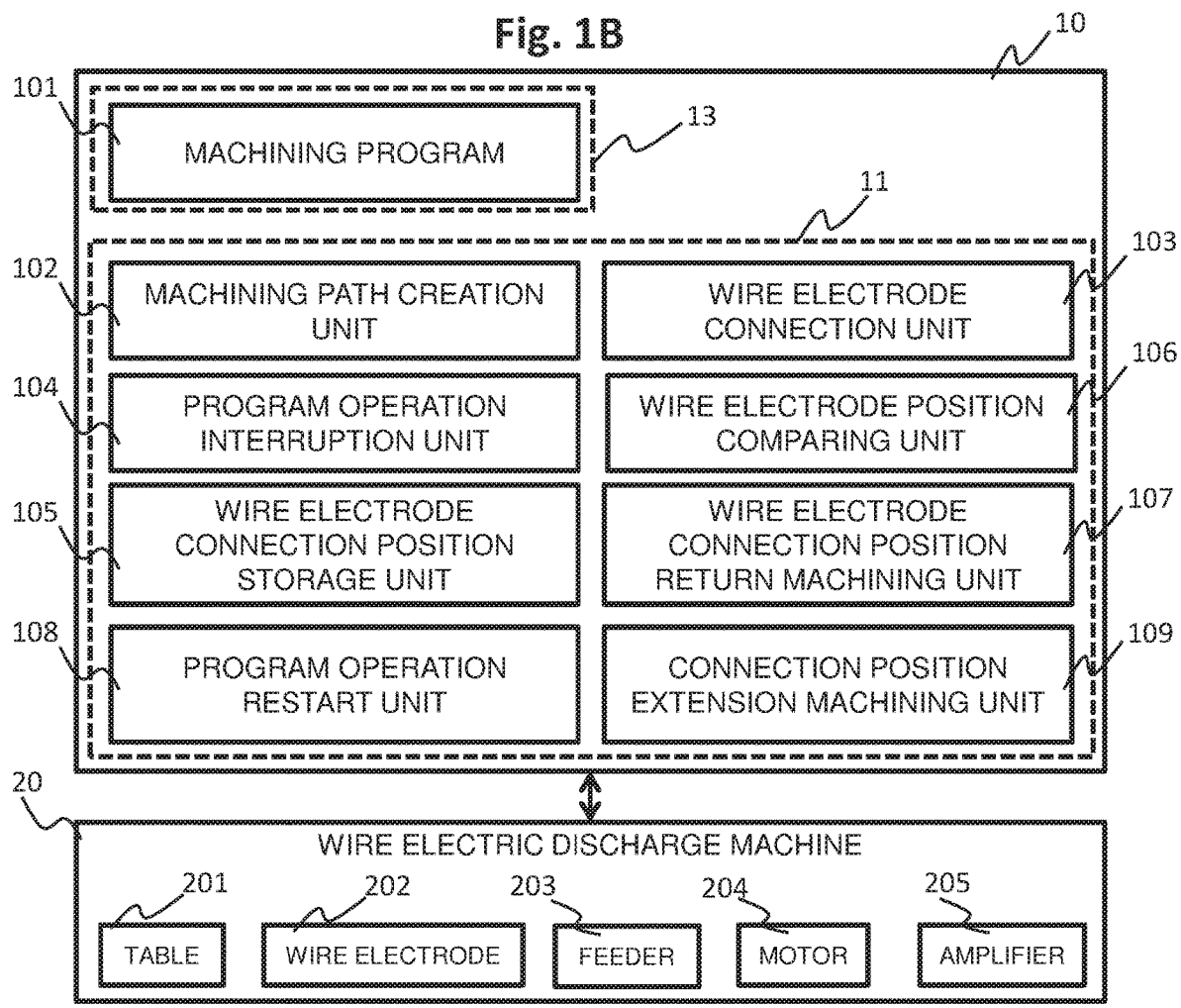
FIG. 1B is a schematic block diagram of a control unit and a wire electric discharge machine according to one embodiment of the present invention.

As schematically shown in FIG. 1B, the control unit 10 for controlling a wire electric discharge machine 20 to perform a program operation in accordance with a machining program 101 includes a machining path creation unit 102, a wire electrode connection unit 103, a program operation interruption unit 104, a wire electrode connection position storage unit 105, wire electrode position comparing unit 106, a wire electrode connection position return machining unit 107, a program operation restart unit 108, and a connection position extension machining unit 109.

In order to perform a program operation in accordance with the machining program, as in the prior art, the control unit 10 comprises the machining path creation unit 102 and the wire electrode connection unit 103. The machining path creation unit 102 analyzes the machining program and creates a machining path based on an axis movement command of the machining program. The wire electrode connection unit 103 connects a wire electrode based on a wire electrode connection command of the machining program. Electric discharge machining on a workpiece is performed by relatively moving the workpiece and the wire electrode of the wire electric discharge machine along the machining path.

Figure 2:
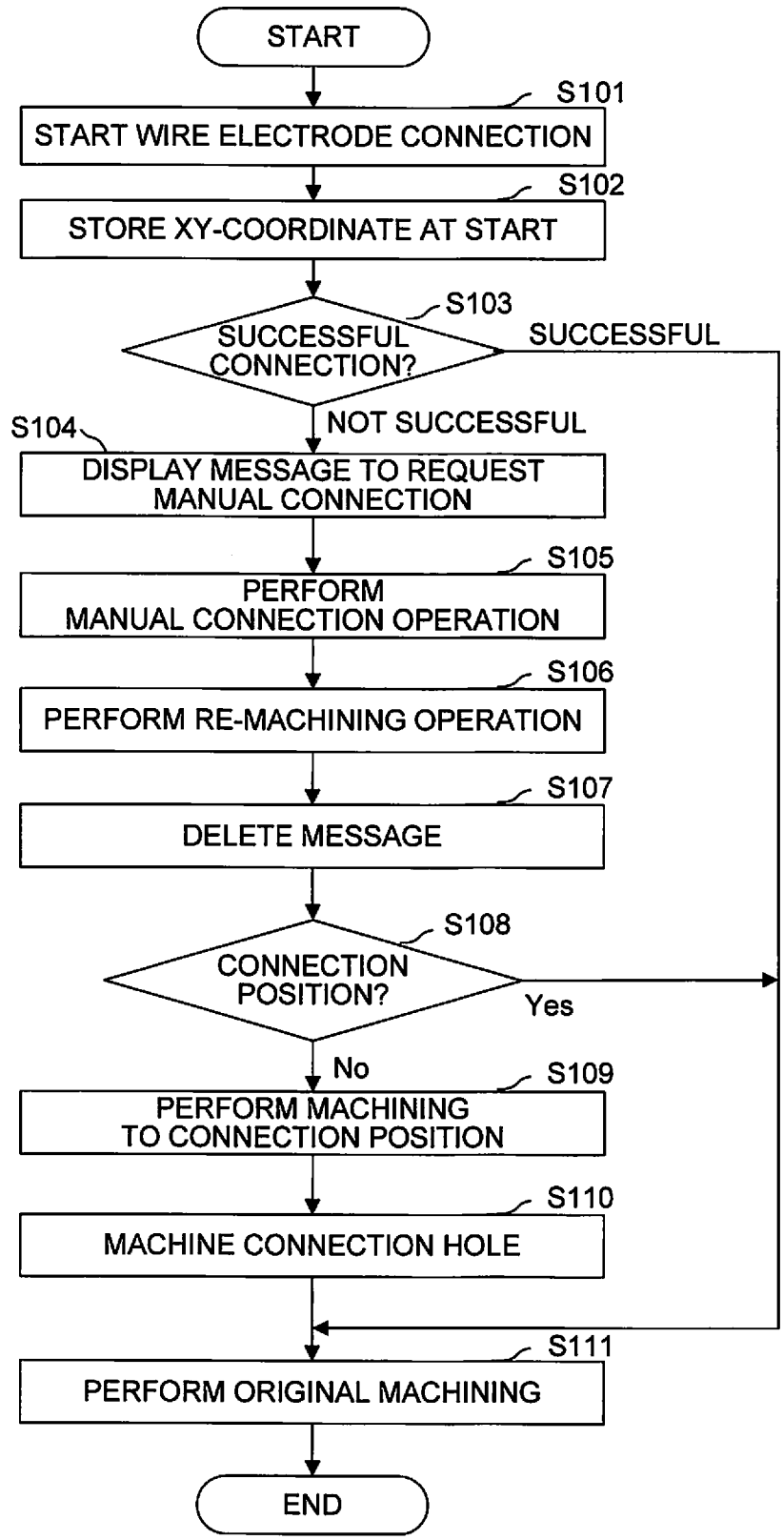
FIG. 2 is a flowchart of processing performed on the wire electric discharge machine according to the one embodiment of the present invention.
Figure 3A:
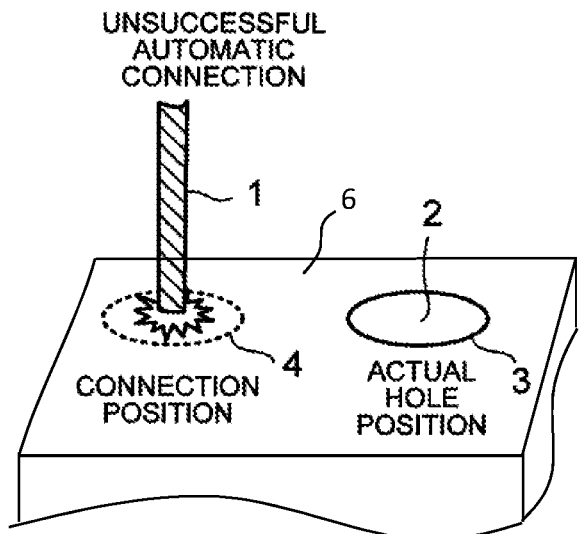
FIG. 3A is a diagram illustrating a state of unsuccessful automatic connection, among other diagrams illustrating steps of procedure from manual wire connection to machining operation restart according to the present invention.
Figure 3B:
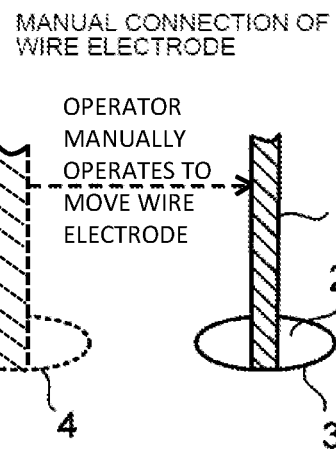
FIG. 3B is a diagram illustrating an operation for manually connecting a wire electrode, among the other diagrams illustrating the steps of procedure from the manual wire connection to the machining operation restart according to the present invention.
Figure 3C:
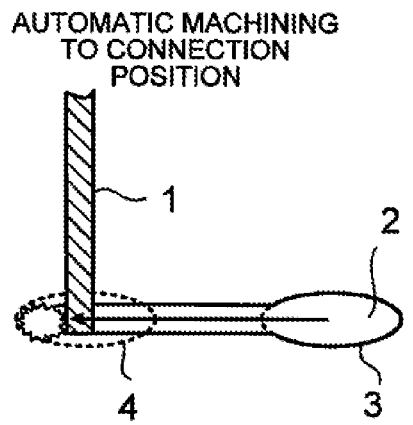
FIG. 3C is a diagram illustrating an operation for automatic machining up to a connection position, among the other diagrams illustrating the steps of procedure from the manual wire connection to the machining operation restart according to the present invention.
Figure 3D:
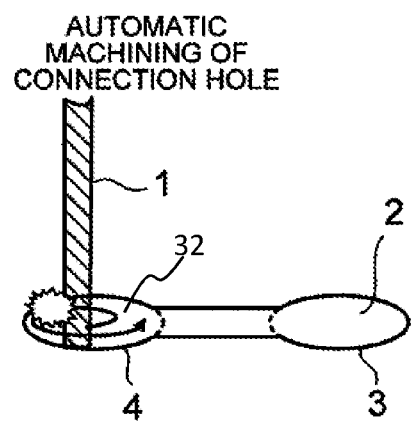
FIG. 3D is a diagram illustrating an operation for automatically machining a connection hole, among the other diagrams illustrating the steps of procedure from the manual wire connection to the machining operation restart according to the present invention.
Figure 4:
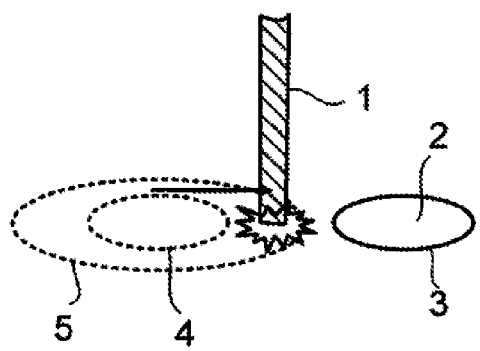
FIG. 4 is a diagram illustrating a problem of automatic wire connection according to the prior art.
Figure 5:
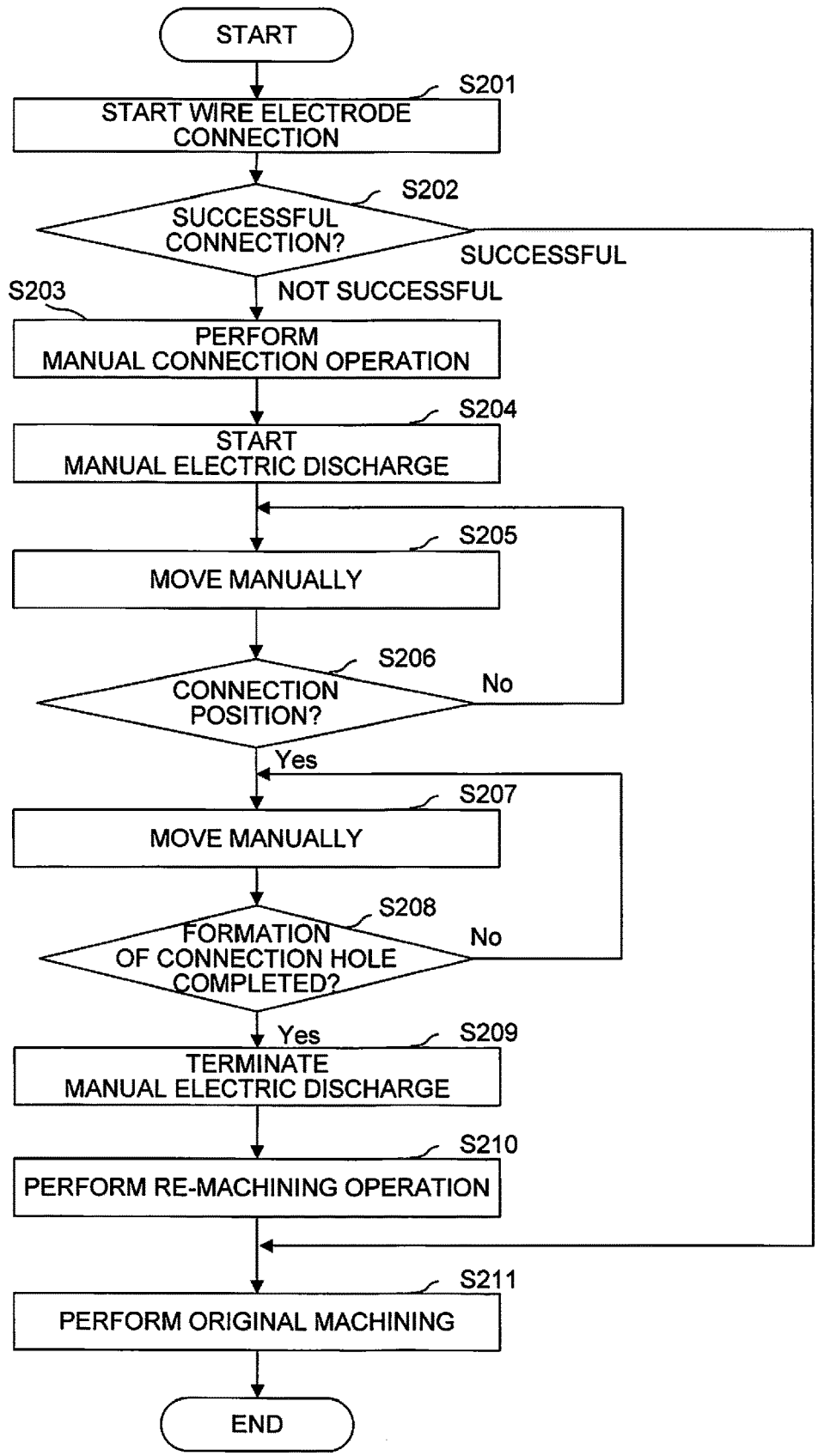
FIG. 5 is a flowchart of processing performed on a conventional wire electric discharge machine.
Figure 6A:
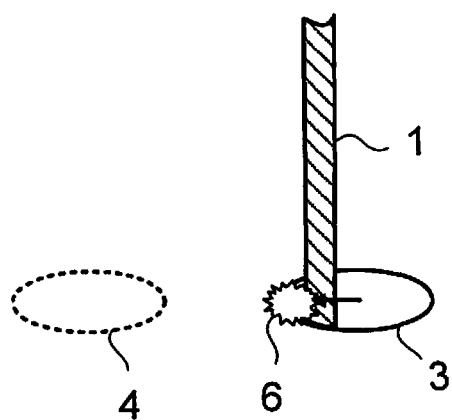
FIGS. 6A, 6B, 6C and 6D are diagrams illustrating steps of procedure from manual wire connection to machining operation restart according to the prior art.
Figure 6B:
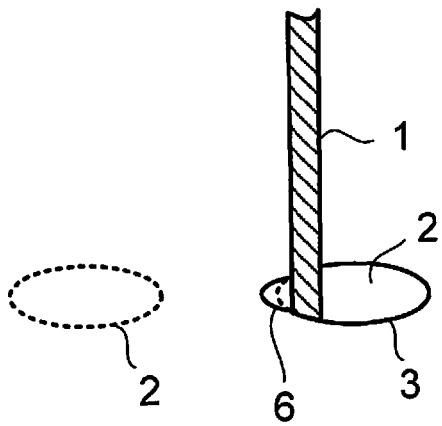
Figure 6C:
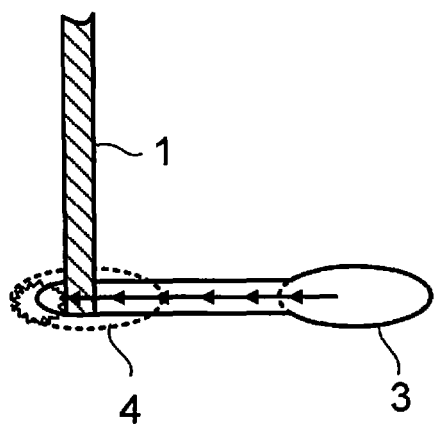
Figure 6D:
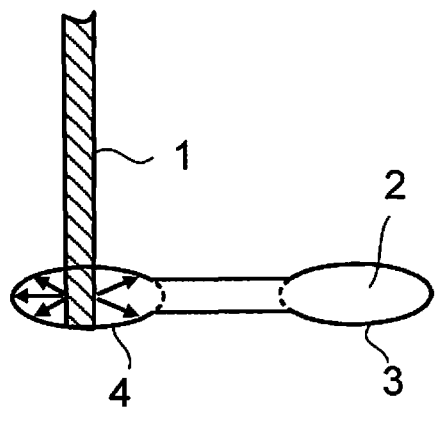

Processing performed on the wire electric discharge machine under the control by the control unit of the present embodiment with this configuration will be described with reference to the flowchart of FIG. 2 and FIG. 3. FIG. 3A is a diagram illustrating a state of unsuccessful automatic connection, among other diagrams illustrating steps of procedure from manual wire connection to machining operation restart according to the present invention. A connection hole 2 is located in a position 3 of an actual hole, and a wire electrode 1 fails in automatic connection in an original connection position 4. FIG. 3B is a diagram illustrating an operation for manually connecting the wire electrode, among the other diagrams illustrating the steps of procedure from the manual wire connection to the machining operation restart according to the present invention. If the automatic connection fails to be achieved, as shown in FIG. 3A, the wire electrode 1 is manually moved to the actual hole position 3 of the connection hole 2 and a manual connection operation is performed. FIG. 3C is a diagram illustrating an operation for automatic machining up to the connection position, among the other diagrams illustrating the steps of procedure from the manual wire connection to the machining operation restart according to the present invention. When the manual connection operation is completed, electric discharge machining is performed up to the original connection position 4. FIG. 3D is a diagram illustrating an operation for automatically machining the connection hole, among the other diagrams illustrating the steps of procedure from the manual wire connection to the machining operation restart according to the present invention. After the wire electrode 1 is relatively moved to the original connection position 4, the hole position 3 is automatically electric-discharge-machined to the original connection position 4. The following is a sequential description of various steps of operation.

[Step S101] Processing for wire electrode connection is started.

[Step S102] An XY-coordinate of the control axis of the wire electrode at the start of the wire electrode connection is stored in the temporary storage area in the RAM 13.

[Step S103] The automatic connection of the wire electrode is attempted and it is determined whether or not the automatic connection is successful. If the automatic connection is successful, the procedure proceeds to Step S111. If not successful, (FIG. 3A), the procedure proceeds to Step S104.

[Step S104] A message to urge an operator to manually connect the wire electrode is displayed on the monitor 17.

[Step S105] The operator operates the control panel or the like to manually move an XY-table so that the wire electrode is aligned with the position of the connection hole and manually connects the wire electrode (FIG. 3B).

[Step S106] The operator performs a re-machining operation for switching from manual control to the automatic control.

[Step S107] The message displayed on the monitor 17 in Step S104 is deleted.

[Step S108] It is determined whether or not the current position of the wire electrode is the original connection position (XY-coordinate position stored in Step S102). If the original connection position is reached, the procedure proceeds to Step S111. If not, the procedure proceeds to Step S109.

[Step S109] The control unit 10 controls the wire electric discharge machine so that the wire electric discharge machining is performed toward the original connection position (XY-coordinate position stored in Step S102) (FIG. 3C).

[Step S110] The control unit 10 controls the wire electric discharge machine so that the wire electric discharge machining is performed in the original connection position to form the connection hole (FIG. 3D).

[Step S111] The machining based on the original program operation is continued.

Thus, in the wire electric discharge machine of the present embodiment, the wire electric discharge machining toward the original connection position (Steps S204 to S206) and the formation of the connection hole (Steps S207 and S208), which are manually performed in the prior art, are performed by the automatic control by means of the control unit 10 (Steps S109 and S110).

According to the wire electric discharge machine of the present embodiment, moreover, if the re-machining operation for switching from the manual control to the automatic control is performed in Step S106 after the wire electrode is manually connected by the operator, processing for checking the wire electrode position, which is to be automatically performed immediately after the execution of the original re-machining operation, is suppressed. Thus, the machining based on the automatic control can be continued even after the wire electrode position is manually moved, so that the wire electrode can be automatically returned to its correct position.

In this way, the manual operation can be completed in a total time of only one minute; 0.5 minute for table movement and 0.5 minute for manual connection. If any failure in the wire electrode connection is anticipated in advance, the entire connection time can be reduced to improve productivity by previously setting the success rate improving operation (Method 1, 3) of the prior art so as not to be performed in a wire electrode connection starting operation.

As shown in the processing of the flowchart described above and in FIG. 1B, the control unit 10 of the wire electric discharge machine 20 according to the present invention comprises the "program operation interruption unit (104) configured to interrupt the program operation if a connection hole for connecting the wire electrode is located in a position deviated from a wire electrode connection position on the machining path (30 in FIG. 3A) so that the connection by the wire electrode connection unit (103) is not completed" (corresponding to Step S103), the "wire electrode connection position storage unit (105) configured to store the wire electrode connection position" (corresponding to the RAM 13 of Step S102), the "wire electrode position comparing unit (106) configured to compare the position of the connected wire electrode and the wire electrode connection position stored by the wire electrode connection position storage unit (105) after the wire electrode is manually moved to the position of the connection hole by an operator, the wire electrode is manually connected in the position of the connection hole, and a re-machining operation is performed" (corresponding to Step S105 and S108), the "wire electrode connection position return machining unit (107) configured to perform machining such that the wire electrode is returned to the wire electrode connection position if the positions compared by the wire electrode position comparing unit (106) are not coincident" (corresponding to Step S109), and the "program operation restart unit (108) configured to restart the program operation after the wire electrode is returned to the wire electrode connection position" (corresponding to Step S111).

The control unit 10 may further comprise the "connection position extension machining unit (109) configured to perform machining to widen a machined groove portion (32 in FIG. 3D) in the wire electrode connection position after the wire electrode is returned to the wire electrode connection position" (corresponding to Step S110), whereby the wire electric discharge machine can restart the program operation after the machining by the connection position extension machining unit (109).

While an embodiment of the present invention has been described herein, the invention is not limited to the above-described embodiment and may be suitably modified and embodied in various forms.

The invention claimed is:

1. A wire electric discharge machine configured to perform a program operation in accordance with a machining program, the wire electric discharge machine comprising:
a wire electrode;
a wire electrode feeder configured to feed the wire electrode;
a motor configured to move the wire electrode relatively to a workpiece to be machined, the workpiece including a connection hole previously formed therein;
an amplifier configured to drive the motor;
a controller coupled to the wire electrode feeder and the amplifier,
wherein the controller includes:
at least one memory storing therein the machining program;
an axis control circuit coupled to the amplifier;
a processor; and
a bus connecting the at least one memory, the axis control circuit, and the processor with each other,
wherein the processor is configured to read the machining program stored in the at least one memory,
wherein the processor comprises a machining path creation unit configured to create a machining path based on an axis movement command of the machining program,
wherein the processor is configured to control the amplifier, via the axis control circuit, to drive the motor to move the wire electrode relatively to the workpiece along the machining path to perform machining of the workpiece,
wherein the processor further comprises
a wire electrode connection unit configured to, upon breakage of the wire electrode, control the wire electrode feeder to feed the wire electrode to perform automatic connection of the wire electrode based on a wire electrode connection command of the machining program,
a program operation interruption unit configured to interrupt the program operation when the previously formed connection hole for connecting the wire electrode is located in a position deviated from the wire electrode connection position on the machining path so that the automatic connection of the wire electrode fails,
a wire electrode position storage unit configured to store the wire electrode connection position in the at least one memory,
a wire electrode position comparing unit configured to, after the wire electrode is manually moved to a position of the previously formed connection hole and manually connected in the position of the previously formed connection hole, and then a re-machining operation is performed, compare the position of the connected wire electrode and the stored wire electrode connection position,
a wire electrode return machining unit configured to, when the compared positions are not coincident, control the amplifier, via the axis control circuit, to drive the motor such that the connected wire electrode is returned, while machining the workpiece, back to the stored wire electrode connection position, and
a program operation restart unit configured to restart the program operation after the connected wire electrode is returned to the stored wire electrode connection position, and
wherein the program operation is performed along the machining path.

2. The wire electric discharge machine according to claim 1, wherein
the processor further comprises an extension machining unit configured to control the amplifier, via the axis control circuit, to drive the motor to move the connected wire electrode relatively to the workpiece to perform machining of the workpiece to widen a machined groove portion in the wire electrode connection position after the wire electrode is returned to the wire electrode connection position, and
the program operation restart unit is configured to restart the program operation after the machined groove portion is widened.

3. A wire electric discharge machine configured to perform a program operation in accordance with a machining program, the wire electric discharge machine comprising:
a wire electrode;
a wire electrode feeder configured to feed the wire electrode;
a motor configured to move the wire electrode relatively to a workpiece to be machined, the workpiece including a connection hole previously formed therein;
an amplifier configured to drive the motor;
a controller coupled to the wire electrode feeder and the amplifier,
wherein the controller includes:
at least one memory storing therein the machining program;
an axis control circuit coupled to the amplifier;
a processor; and
a bus connecting the at least one memory, the axis control circuit, and the processor with each other,
wherein the processor is configured to read the machining program stored in the at least one memory,
wherein the processor comprises a machining path creation unit configured to create a machining path based on an axis movement command of the machining program,
wherein the processor is configured to control the amplifier, via the axis control circuit, to drive the motor to move the wire electrode relatively to the workpiece along the machining path to perform machining of the workpiece,
wherein the processor further comprises
a wire electrode connection unit configured to control the wire electrode feeder to feed the wire electrode to perform automatic connection of the wire electrode based on a wire electrode connection command of the machining program,
a program operation interruption unit configured to interrupt the program operation when the automatic connection of the wire electrode at a wire electrode breakage position on the machining path fails,
a wire electrode position storage unit configured to store the wire electrode breakage position in the at least one memory,
a wire electrode position comparing unit configured to, after the wire electrode is manually moved to a position of the previously formed connection hole and manually connected in the position of the connection hole, and then a re-machining operation is performed, compare the position of the connected wire electrode and the stored wire electrode breakage position, a wire electrode return machining unit configured to, when the compared positions are not coincident, control the amplifier, via the axis control circuit, to drive the motor such that the connected wire electrode moves and cuts a returning path in the workpiece back to the stored wire electrode breakage position, and a program operation restart unit configured to restart the program operation after the connected wire electrode is returned to the stored wire electrode breakage position, and wherein the program operation is performed along the machining path.

4. The wire electric discharge machine according to claim 3, wherein the processor further comprises an extension machining unit configured to control the amplifier, via the axis control circuit, to drive the motor to move the connected wire electrode relatively to the workpiece to perform machining of the workpiece to widen a machined groove portion in the wire electrode breakage position after the wire electrode is returned to the wire electrode breakage position, and the program operation restart unit is configured to restart the program operation after the machined groove portion is widened.

* * * * *